United States Patent

[11] 3,614,762

| [72] | Inventor | Elbert B. Childs |
| | | Hastings-on-Hudson, N.Y. |
| [21] | Appl. No. | 765,842 |
| [22] | Filed | Oct. 8, 1968 |
| [45] | Patented | Oct. 19, 1971 |
| [73] | Assignee | Mobil Oil Corporation |

[54] TANK RUNOUT WARNING SIGNAL
12 Claims, 2 Drawing Figs.

[52] U.S. Cl. .................................................. 340/244 B, 73/308
[51] Int. Cl. ....................................................... G08b 21/00
[50] Field of Search ............................................ 340/244, 248; 73/304, 308, 313; 200/84

[56] References Cited
UNITED STATES PATENTS

| 1,217,882 | 2/1917 | Roma | 73/308 X |
| 2,866,866 | 12/1958 | Laplante | 340/244 UX |
| 2,877,318 | 3/1959 | Culley | 200/84 |
| 2,968,172 | 1/1961 | Johnson | 340/244 UX |
| 3,498,131 | 3/1970 | Rickey | 340/244 X |
| 3,304,381 | 2/1967 | McAnespey | 340/248 UX |

Primary Examiner—John W. Caldwell
Assistant Examiner—Daniel Myer
Attorneys—Oswald G. Hayes, Andrew L. Gaboriault and Carl D. Farnsworth ABSTRACT: A liquid level indicator and alarm wherein a contact is secured to a movable element of a liquid level gauge, and a fixed contact is secured to the housing thereof. As the liquid level varies, the position of the movable element likewise varies and when the liquid reaches a predetermined level, the fixed and movable contact elements complete a circuit which triggers an alarm.

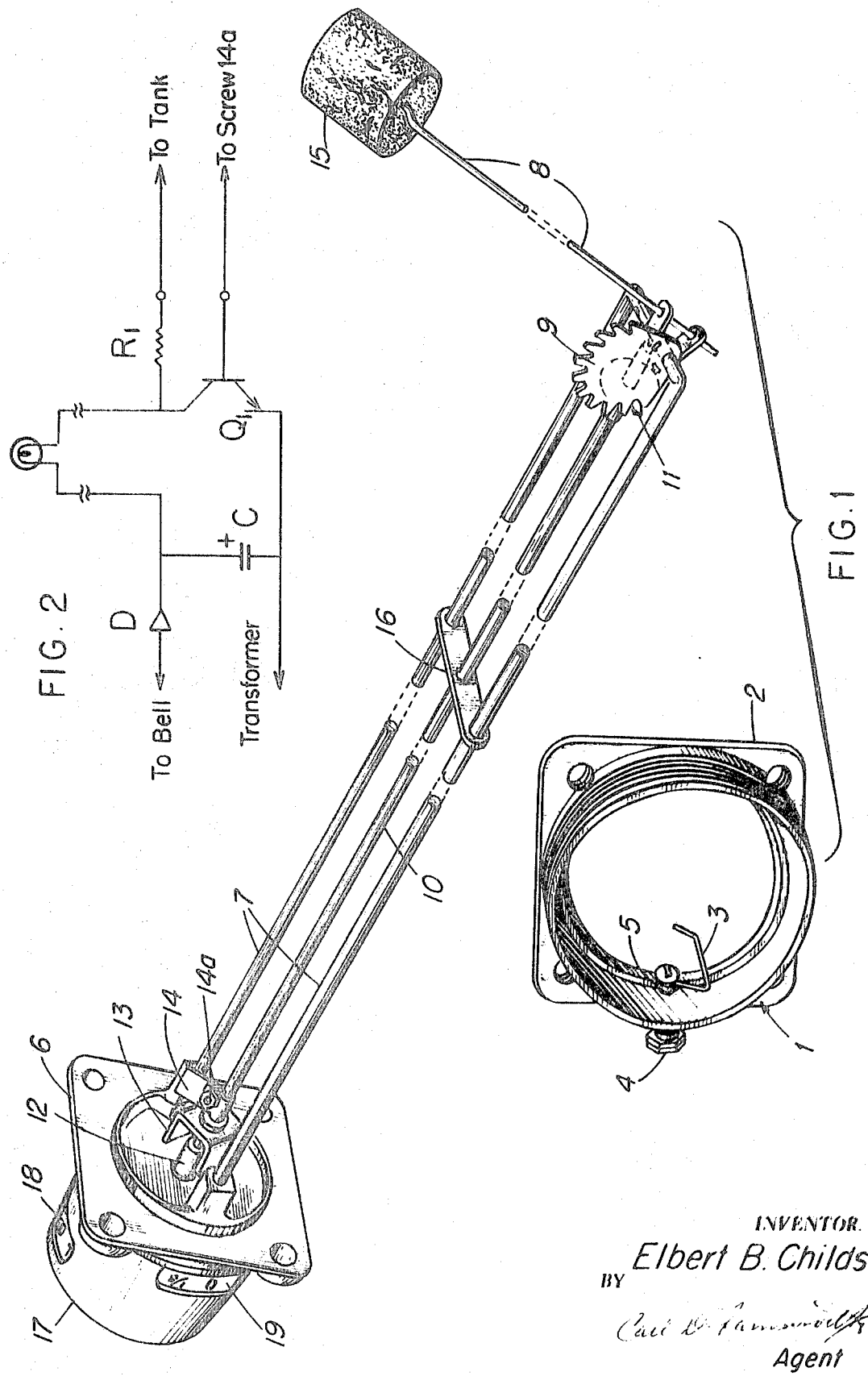

TANK RUNOUT WARNING SIGNAL

This invention relates to liquid level indicators and more particularly to an indicator and alarm for a liquid level gauge having a movable element, the position of the movable element being a function of the level of the liquid.

The invention will be described herein with reference to fuel oil gauges used in basement-type fuel oil tanks. However, it will become clearly apparent that the principles disclosed are equally applicable to many other types of liquid gauges presently in use.

Level gauges for basement fuel oil tanks and other similar uses have been well known in the art for many years. These gauges provide a visual indication of the level of fuel oil remaining in the tank. However, in order for the level to be ascertained, one must physically inspect the gauge, which is usually inconveniently located.

In home oil heating systems, for example, it frequently occurs that the fuel oil tank, which is generally in the basement, runs out and the fuel oil company must provide emergency service to the customer. This is due to the fact that most homeowners and building superintendents do not check the level of the fuel in the tank often enough Many methods have been tried in the past to minimize the number of emergency service calls that must be made under such conditions. For example, it has been found that making periodic deliveries regardless of a request is not satisfactory solution to the problem since in some instances, due to emergency conditions, the heating system may be operating at a higher capacity than normal and the fuel oil tank prematurely runs dry. Providing oil company employees to periodically check the tanks is also not an efficient enough solution. From experience, it has also been found that any early warning system relying upon the homeowner or building superintendent to physically inspect the gauge to determine the level of fuel in the tank and to notify the oil company when the level is low, is not reliable enough to substantially reduce the occurrences of fuel oil tanks running prematurely dry.

One of the hazards involved in providing an indicator and alarm for fuel tanks is that sparks or high currents present within the tank could possibly cause an explosion. This hazard must scrupulously be avoided in any endeavor to provide a safe indicator and alarm. The oil within the tank itself is not explosive, but as the level of fuel goes down, an explosive fuel vapor forms within the tank above the liquid. As the level gets lower, the amount of fuel vapor in the tank increases, thus increasing the danger of explosion from sparks or the like. In fact, at the point at which it is desired to produce an alarm indication of low fuel level, the amount of fuel vapor is near its maximum and the danger of explosion is greatest. Therefore, any indicator and alarm system for fuel oil tanks should not cause any sparks, arcing or high currents to be present within the tank.

Fuel oil gauges similar to those presently in use have been in commercial use for nearly 30 years. However, to date, no inexpensive, safe and reliable runout warning system for fuel oil tanks has been devised.

Therefore, the main object of this invention is to provide a simple, inexpensive and safe level indicator and alarm system for liquid tanks, which is easily attached to existing liquid level gauges.

Another object of this invention is to provide such a liquid level indicator and alarm system wherein an alarm is provided remote from the location of the tank and in a position so that it will be easily observed by the homeowner or building superintendent.

According to this invention, a liquid level indicator and alarm includes a switching means coupled to the movable element of a liquid level gauge, the position of the movable element being a function of the level of the liquid in a tank. When the movable element reaches a predetermined position, the switching means is operated and an alarm means connected to the switching means and mounted remote from the liquid level gauge is activated to positively indicate that the liquid in the tank has reached a predetermined level. The above-mentioned and other features and objects of this invention will become apparent by reference to the following description taken in conjunction with the accompanying drawings, in which;

FIG. 1 is a pictorial illustration of one of the most popular fuel gauges for fuel oil tanks modified to include an indicator and alarm according to this invention; and FIG. 2 illustrates the electrical circuitry which is connected to the modified fuel gauge of FIG. 1 to provide remote indication of low fuel level according to this invention.

Referring to FIG. 1, there is shown a Universal oil tank gauge manufactured by American Standard Controls Division, Detroit, Michigan, modified according to this invention. A collar 1 having a flange 2 thereon is screwed to a threaded opening in a fuel tank. Insulatingly secured to the collar 1 is a contact element 3 made of a spring metal or the like. The spring metal contact 3 is insulatingly secured to the collar 1 by means of a screw 4 and an insulating member 5. The upper portion of the fuel gauge includes a flange 6 which is secured to flange 2 by means of appropriate screws. Secured to the upper portion of the fuel gauge is an elongated U-shaped member 7 to which is hingedly mounted a float arm 8 and a gear 9 in a manner well known in the art. Mounted between the legs of the U-shaped member 7 is a shaft 10, to which is secured a gear 11 which meshes with gear 9. Shaft 10 is rotatably mounted at its lower end in a recess within the lower part of the U-shaped member 7 and at its upper end in a retaining member 12 of the underside of the flange 6. A U-shaped magnet 13 is secured to the upper end of shaft 10 and a contact element 14 is also secured to the upper end of shaft 10. A cork float 15 is secured to the remote end of arm 8 and a retaining member 16 is provided towards the lower end of the U-shaped member 7 and shaft 10 to maintain said elements in position.

The portion of the fuel gauge mounted in the header portion thereof which is outside the fuel tank includes a sealed-off chamber in which is rotatably mounted an indicating scale which is magnetically coupled to the U-shaped magnet 13. Rotation of U-shaped magnet 13 causes corresponding rotation of the scale within the header 17 and the level of the tank is read through either of the two windows 18, 19 in the header 17.

The operation of the fuel gauge is as follows. This particular fuel gauge is mounted vertically in a fuel tank and as the level of the liquid therein varies, the float 15 assumes various positions. Movement of the arm 8 which is coupled to float 15 is coupled to shaft 10 by means of mating gears 9 and 11 to cause shaft 10 to rotate as a function of the fuel level in the tank. Rotation of shaft 10 causes corresponding rotation of the magnet 13 and contact 14. As the contact 14 is caused to rotate, eventually it will come into contact with fixed contact member 3 which is mounted to the collar 1. At this point, an electrical circuit is completed which causes an alarm to be activated to indicate low fuel level. As can be readily seen from the drawing, the position of contact 14 is variable and thus, the point at which contact 14 makes contact with member 3 may likewise be varied to cause the alarm to be activated at any desired fuel level within the tank.

As set forth in detail in the introduction to this specification, a prime consideration in the design of any fuel indicator and alarm for use with fuel oil tanks is that high electrical currents and arcing or sparking must be avoided within the tank, especially at low fuel levels where the amount of the explosive fuel vapor is greatest. To this end, the circuitry of FIG. 2 is utilized in conjunction with the apparatus of FIG. 1 to provide the required indication with substantially no electrical hazards.

In FIG. 2 there is shown a typical electronic circuit for meeting the above requirements. This circuit includes a transistor Q1 having its base electrode connected to the end of screw 4 which is outside of the fuel tank. Again it is noted that screw 4 is insulatingly mounted to member 1. The collector electrode of transistor Q1 is connected to the tank housing or to the housing of the fuel gauge via a resistor $R_1$. This connection may be made at one of the screws securing flanges 2 and 6 together or at any other convenient point. The collector electrode of transistor Q1 is further connected to a remotely located indicator alarm which in this embodiment is illustrated as a lamp. The other end of lamp L is connected to a source of supply Voltage which in this case is supplied by a bell transformer an AC to DC converter shown in FIG. 2 as a Diode and Capacitor. The emitter electrode of the transistor Q1 is connected to the negative end of the power supply. In FIG. 2, the negative end of the power supply corresponds to the negative terminal of Capacitor C. The transistor Q1 is normally in its "off" condition and the lamp is normally extinguished. As the level of fuel in the tank changes, the position of the arm 8 and float 15 likewise varies, causing a corresponding rotation in rotatable shaft 10. The rotation of shaft 10 causes movement of contact member 14 towards fixed contact member 3. When the level of the fuel in the tank reaches a predetermined value, the contact member 14 will make electrical contact with the fixed contact member 3 to complete the circuit between the collector and base electrodes of transistor Q1 via the resistor $R_1$. This turns on the transistor and causes the remotely located lamp L to the light, thereby indicating that the fuel has reached the predetermined level which is usually approximately one-eighth full. The lamp will remain lit as long as the fuel remains at the predetermined level or lower, thus providing a constant indication of low fuel level and increasing the probability that the homeowner or building superintendent will notice that the tank should be filled and call the fuel oil company for service, before the tank actually runs dry. When the tank is subsequently filled up, the float 15 will rise causing the shaft 10 to rotate and the contact member 14 to move out of contact with the fixed contact member 3, thereby causing the transistor to turn off and extinguish the lamp.

The circuitry illustrated in FIG. 2 will operate properly if the secondary winding of the bell transformer is electrically floating (i.e., not connected to ground) or if the fuel tank itself is not connected to ground potential. However, if both the fuel tank and one end of the bell transformer are connected to a common ground, the circuitry of FIG. 2 will not operate properly. In that event, the switching circuit shown may be easily modified in a manner well known in the art to provide proper operation.

The isolation provided by the transistor amplifier Q1 insures that the current flowing in the fuel tank at any time during the operation of the indicator and alarm according to this invention is limited to the milliampere range. Depending upon the lamp used, the current flowing in the collector circuit of the transistor Q1 may be on the order of approximately one-quarter to one-half ampere while the current flowing in the base circuit thereof will be approximately 10 milliamperes or less. Thus, since such low currents are flowing in the circuitry within the fuel tank, there is no danger of explosion due to sparks or the like.

Also, the fixed contact member 3 is fabricated from a spring metal and formed such that there will be a "wiping action" each time the movable contact member 14 contacts the fixed contact member 3. This wiping action effectively cleans the contacts each time contact is made, minimizing the accumulation of dirt on the contacts to insure proper operation of the indicator and alarm circuitry. The presence of a film of fuel oil in the contacts will cause no detrimental effects due to this wiping action and the presence of such low operating currents within the tank eliminates the danger of explosion.

In a preferred embodiment, phosphor bronze is utilized for the contact members 3 and 14 to minimize corrosion. In a preferred embodiment of the circuitry of FIG. 2, the following list of components was utilized:

$R_1$—4700 ohm, one-half watt;
Q1—2 N 3053;
D—ST 40 C;
C—16 $\mu f$., 150 volt;
L—No. 47 lamp.

It should be clear that any other power source may be utilized in place of the bell transformer of FIG. 2. The bell transformer was utilized for convenience since it is present in substantially all homes in which the indicator and alarm system according to this invention may be installed. An advantage to using the existing bell transformer is that the cost of the system will be reduced and installation costs are held to a minimum since ordinary bell wire can be used without violating the electrical codes where the unit is installed. However, it is obvious that a separate power supply may be provided or a long life battery may be utilized to provide power for the circuitry of FIG. 2. Such modifications are clearly within the skill of those ordinarily versed in the art and are not described in detail herein.

As noted from FIG. 1, contact member 14 is secured to rotatable shaft 10 by means of a screw and nut 14a. By loosening the screw 14a and adjusting the angular position of the contact member 14 on the shaft 10, the point at which the contact members 14 and 3 engage can be varied. This allows the changing of the level at which the remote indicator will be activated. However, in most applications, it is sufficient to activate the remote indicator when the level in the fuel tank reaches one-eighth full.

Another embodiment of the invention comprises installing a sealed reed relay within the collar 1 of the fuel gauge shown in FIG. 1. A magnet may then be adjustably mounted to rotating shaft 10 in a manner similar to which contact 14 is adjustably mounted thereto. A pair of leads from the reed relay may then be passed through a sealed hole in collar 1 in a manner well known in the art. If a reed relay having a high enough current rating is used, the contacts thereof may be led directly to a remotely located indicator such as a lamp or the like. If the contacts of the reed relay are not capable of directly driving such an indicator, they may be fed to the input leads of the circuit shown in FIG. 2 or a similar switching circuit having the required characteristics.

As the angular position of shaft 10 varies when the level of the fuel in the tank varies, the angular position of the magnet relative to the position of the fixedly mounted relay will likewise vary. When the magnet is in close proximity to the reed relay, the contacts thereof will be operated and the indicator circuit will be activated in a manner similar to that described above for the fuel gauge shown in FIG. 1. Since the position of the magnet is adjustable in much the same manner as the position of contact member 14 of FIG. 1 is adjustable, the level at which the contacts of the reed relay are operated is easily varied.

The system utilizing a reed relay within the fuel tank has the advantage that the contacts thereof are sealed and there is absolutely no possibility of producing sparks or the like which could cause an explosion. However, the cost of the system utilizing reed relays is substantially higher than the cost of the device shown in FIG. 1.

The above-described invention has been described in detail in conjunction with the Universal oil tank gauge manufactured by American Standard Controls Division. However, it could be easily modified for use with many of the other fuel gauges presently in use within the spirit of this invention.

While I have described above the principles of my invention in connection with specific apparatus, it is to be clearly understood that this description is made only by example and that many other variations are possible within the scope of my invention as set forth in the accompanying claims.

I claim;

1. A liquid level indicator and alarm for use in an explosive or inflammable environment within a tank containing a liquid, comprising:
   a housing member (1) mounted to said tank;
   a rotatable element (10) extending into said environment within said tank, the angular position of which is a function of the liquid level in the tank;
   switching means including:
      a first contact (14) mounted on said rotatable element (10) and located in said environment; and a second contact (3) mounted to said housing member (1) and located in said environment;

said contacts (14, 3) making electrical contact when said rotatable element (10) reaches a predetermined position corresponding to a predetermined liquid level in the tank;

alarm means mounted remote from said tank and operable responsive to operation of said switching means for remotely indicating that said liquid is at said predetermined level; and spark and arc suppression means including an amplifier means coupling said switching means to said alarm means for reducing the electrical current flowing through said switching means when operating said alarm means to a value sufficiently low such that no sparks, arcing, or the like will occur when operating said alarm means, thereby eliminating the explosion hazard within the tank.

2. Apparatus according to claim 1, wherein said housing portion is a conductor and wherein said second contact is insulatingly mounted thereto, said second contact being coupled to said spark and arc suppression means.

3. Apparatus according to claim 1, wherein said first contact is adjustably mounted to said rotatable element such that the liquid level at which said switching means will be operated can be varied.

4. Apparatus according to claim 1, wherein said first contact is a metallic blade element and said second contact is a spring metal contact.

5. Apparatus according to claim 1, wherein at least one of said contacts is made of phosphor bronze.

6. Apparatus a according to claim 1, further comprising:
a float;
an arm connected to said float, the position of said arm being a function of the liquid level within said tank; and
gear means coupling said arm to said rotatable element to cause said rotatable element to assume various angular positions in accordance with the level of the liquid within the tank.

7. Apparatus according to claim 1 comprising indicating means coupled to said rotatable element for continuously indicating the liquid level within said tank.

8. A liquid level indicator and alarm for use in an explosive or inflammable environment within a tank containing a liquid, comprising:
a housing member (1), at least a portion of said housing member being mounted to said tank and being located in said environment;
a rotatable element (10) mounted in said environment, the angular position of said rotatable element being a function of the liquid level in the tank;
means (13, 17-19) coupled to said rotatable element (10) for continuously indicating the liquid level within said tank;
switching means including:
a fixed contact (3) insulatingly mounted to said housing member (1) and located in said environment within said tank; and
a movable contact (14) adjustably connected (14a) to said rotatable element (10) and located in said environment within said tank for contacting said fixed contact (3) when said rotatable element (10) reaches a predetermined position corresponding to a predetermined liquid level;
spark and are suppression means including an electrical current amplifying means coupled to said switching means; and
alarm means coupled to the output of said spark and arc suppression means and activated when said fixed and movable contacts (3 and 14) make electrical contact, said alarm means being mounted remote from said liquid level gauge for remotely indicating that said liquid is at said predetermined level, said spark and arc suppression means substantially reducing the amount of electrical current flowing through said switching means upon operation thereof in operating said alarm means, thereby eliminating the explosion hazard within the tank.

9. Apparatus according to claim 8, further comprising:
a float;
an arm connected to said float, the position of said arm being a function of the liquid level within said tank; and
gear means coupling said arm to said rotatable element to cause said rotatable element to assume various angular position sin accordance with the level of the liquid within the tank.

10. Apparatus according to claim 8, wherein said movable contact is a metallic blade contact and said fixed contact is a spring metal contact.

11. Apparatus according to claim 10, wherein said movable contact is adapted to wipe said fixed contact when said fixed and movable contacts engage.

12. Apparatus according to claim 8, wherein at least one of said contacts is made of phosphor bronze.